Figures 1, 2:
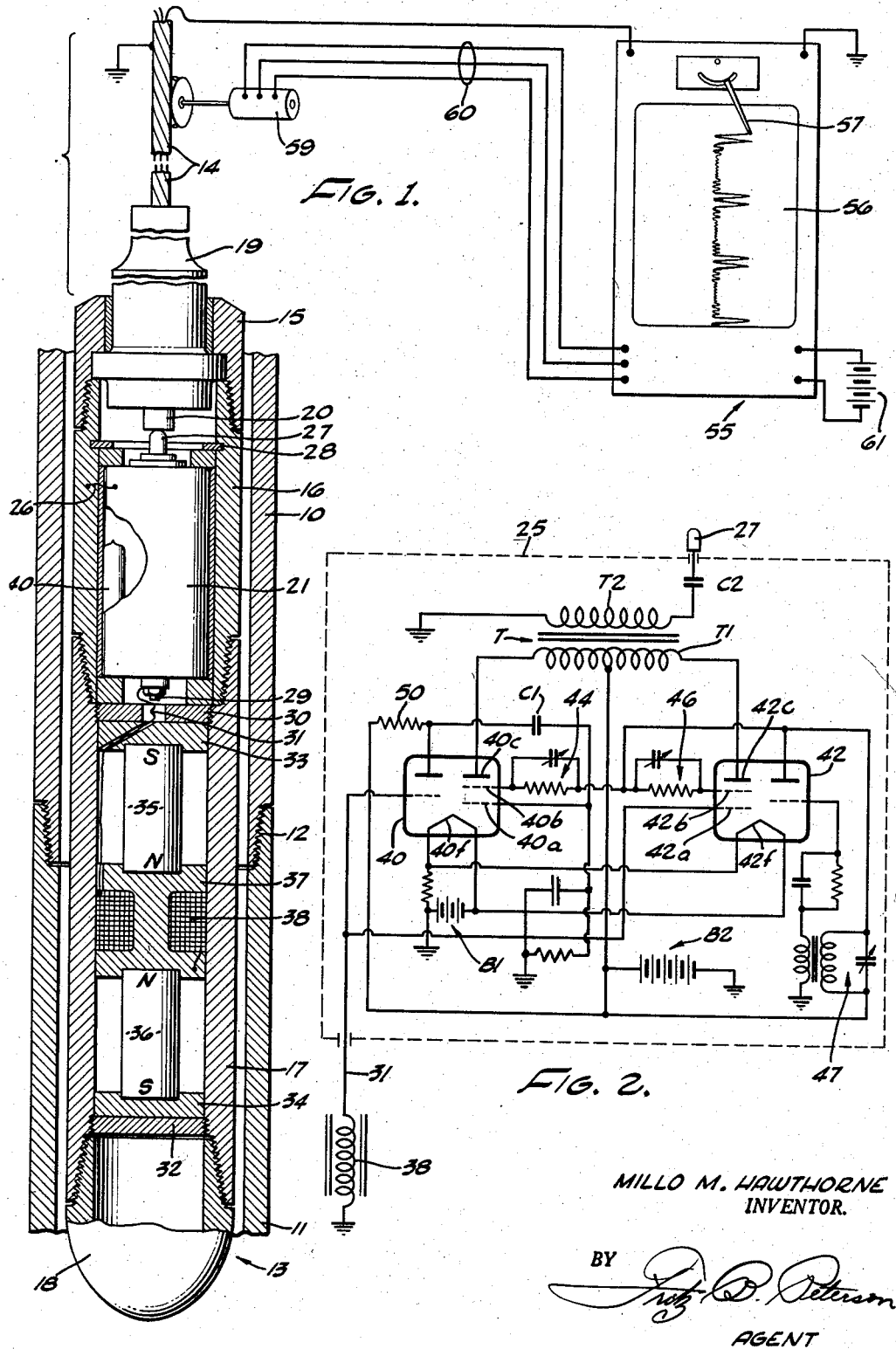

July 28, 1959

M. M. HAWTHORNE 2,897,440

EARTH WELL CASING DISCONTINUITY DETECTOR

Filed April 12, 1955

MILLO M. HAWTHORNE
INVENTOR.

BY

AGENT

United States Patent Office 2,897,440
Patented July 28, 1959

2,897,440

EARTH WELL CASING DISCONTINUITY DETECTOR

Millo M. Hawthorne, Houston, Tex., assignor, by mesne assignments, to Dresser Industries, Inc., Dallas, Tex., a corporation of Delaware Application April 12, 1955, Serial No. 500,862

9 Claims. (Cl. 324—37)

This invention relates to the art of well logging and well casing perforation, and more especially to a method and apparatus for detecting and locating one or more joints in a steel casing in an earth borehole such as an oil well.

In various types of well operations, such as for example, well borehole logging, casing perforating, and surveying operations, it is of considerable value to be able to place or position apparatus in the borehole at a definite location with respect to the top or the bottom of the borehole. Since exact or accurate measurements of depths in earth boreholes in general, and especially of great depths in very deep boreholes, are practically impossible of attainment, it is convenient and is general practice to employ reference markers such as, for example, the joints in the casing in such a borehole, in defining the locations of special points of interest. Actual physical depth from the surface to a particular location of interest in a borehole is seldom of any practical importance, and in view of the difficulty of arriving at exact depth measurements, it has been general practice to locate special points of interest in the borehole with respect to particular joints of the casing therein. Various mechanical, electrical and magnetic detecting devices have heretofore appeared in the art for the purpose of locating the joints in the well casing or of recording signals indicating passage of such joints by a tool or instrument lowered into or traversed through the casing. It is to an improved type of such device that the present invention relates.

It is a specific object of the present invention to provide a casing joint detector of simple and inexpensive construction which may be used in conjunction with apparatus employed for other borehole operations such as, for example, casing perforating.

It is another object of the present invention to provide a casing joint detector capable of use with casing perforating apparatus and capable of using the same electrical circuits provided for the perforating apparatus in the suspending cable extending between the perforating apparatus and the exterior of the borehole.

It is an additional object of the invention to provide an effective casing joint detector for providing a signal when traversed past a joint in a casing in an earth borehole.

Other objects and advantages of the present invention will hereinafter become apparent in connection with the appended specification and description of a preferred embodiment of physical apparatus according to the invention, and the drawings illustrating the same, in which:

Figure 1 is a diagrammatic view, partly in vertical cross-section, of a typical sectional joint of a well casing with apparatus according to the present invention located therein, and indicating diagrammatically electrical connections from apparatus in the casing to the surface of the earth and appurtenant apparatus located at the surface of the earth; and Figure 2 is a circuit diagram of a preferred form of electrical signaling apparatus used in the means traversing the casing and locating or detecting the casing joints.

Referring now to the drawings, and to Figure 1 in particular, there are shown two interconnected sections of steel well casing 10 and 11 having mating threaded ends screwed together to form a casing joint 12 of the type having a smooth interior and probably of the type ordinarily most difficult to detect or locate. It will be understood that other types of casing joints, such as those commonly formed by uniting two sections of casing with a casing collar, as well as other types of casing discontinuities, and magnetic markers, may be detected or located with equal facility by the apparatus of the invention. Suspended within the casing for traversal therethrough is a container generally indicated by the numeral 13, supported by a conventional multiconductor electric cable 14 which may be of great length and for which reason only small sections of which are shown. The cable, as well understood, is adapted to be unwound from a storage drum or reel to lower or traverse the container 13 and the contained apparatus through the casing in the borehole, and to be rewound on the drum or reel to withdraw the container 13 from the borehole in an upward traverse. The cable may comprise a plurality of insulated electric conductors, usually three in number, and a metallic armor sheath which is commonly employed as a ground for electrical apparatus suspended by the cable. Electrical conductors comprised in the cable are employed for transmission of electrical current or power from one or more sources of supply at the surface of the earth to the apparatus suspended by the cable, and it is obviously desirable that the number of such conductors be kept at a minimum. The apparatus supported by the cable and traversed through the borehole thereby may comprise electrical logging apparatus, surveying apparatus, casing perforating apparatus, and/or the casing joint detecting or locating apparatus hereinafter disclosed in detail. Container 13 is of plural-section construction comprising an upper support collar 15, an upper tubular section 16 and a lower tubular section 17, the lower end of which is adapted to threadably engage and support borehole logging apparatus, casing perforating apparatus, or the like, or, as shown, a container closure in the nature of a bullhead 18. The container, especially section 17 thereof, is preferably made of non-magnetic material for reasons hereinafter more fully explained, and the joints and openings thereof are suitably sealed. Sealed in supporting collar 15 is a cable head 19 of ordinary construction in which cable 14 is anchored and terminated, and from the lower end of which protrudes at least one insulated electrical contact 20, which is electrically connected to one of the cable conductors. Mounted in container section 16 and surrounded by suitable cushioning material is a sealed apparatus case 21 in which is mounted the electrical apparatus diagrammatically illustrated within the dashed-line rectangle 25 shown in Figure 2. Apparatus case 21 is suitably grounded to the metallic structure of the container, as indicated by numeral 26 in Figure 1. The case is provided at its upper end with an insulated resilient electrical contact 27 arranged and adapted to form a good electrical connection with the aforementioned contact 20. The apparatus case is held against undue upward movement in container 13 by means including an internal lock ring 28 suitably seated in a peripheral recess or seat formed in container section 16. At its lower end case 21 is provided with an electric terminal 29 forming a hermetically sealed lead-in to the apparatus in the case. Threadedly secured in the upper end of container section 17 is a perforated partition plate 30 preferably formed of non-magnetic material. This partition plate serves to support case 21 and its cushioning material within upper container section 16, and a perforation in the plate provides space for passage of a coiled or folded electric lead from apparatus case 21 to structure positioned below plate 30, as indicated. Threadably secured in the lower end of container section 17 is a second partition plate 32, also preferably of nonmagnetic material. Firmly clamped between partition plates 30 and 32 in the interior of container section 17 is a magnetic structure comprising upper and lower recessed pole pieces 33 and 34, formed of iron or other high-permeability material. Also included in the magnetic structure and firmly seated between pole pieces 33 and 34 is a pair of strong permanent magnets 35 and 36 recessed into and separated from each other by a coil-supporting central pole piece 37, all as indicated in Figure 1. The magnets may be of round, or other cross-sectional shape. Central pole piece 37, as indicated, is recessed peripherally for the reception and support of an induction coil 38, shown in section in Figure 1 and one end of which is grounded as indicated to magnetic pole piece 37 and the other end of which is connected electrically to an end of lead 31 connected to the aforementioned terminal 29. The magnetic structure thus just described is such that when located in the interior of a single length of well casing, the magnetomotive force-producing electromagnets 35 and 36 provide a pair of substantially balanced magnetic field or flux paths in which each of the magnetic flux paths extends from one pole to another of the respective magnets, outwardly through one of the pole pieces, through the nonmagnetic wall of container section 17, into a longitudinally extending portion of the well casing 10, and therealong to a point of passage back through container section 17 and into the other pole piece. As the magnetic structure included in container 13 is traversed through the casing, the two magnetic fields set up by the two permanent magnets 35 and 36 are generally balanced with the result that no magnetic lines of flux link or cut the turns of coil 38 and therefore practically no voltage is induced in the coil. However, as the magnetic structure is traversed past a joint in the casing, first one of the magnetic fields or flux paths will be disrupted or distorted by the magnetic anomaly caused by the joint, resulting in considerable lines of magnetic flux being cut by the turns of coil 38 in one direction, with consequent induction of a potential of considerable magnitude of one polarity in the coil. Shortly thereafter, the other of the two magnetic fields or flux paths will be similarly disrupted, distorted, or unbalanced, with the result that the turns of coil 38 will cut a considerable number of magnetic flux lines in the opposite direction with consequent induction in the coil 38 of a considerable potential of polarity opposite that first induced. Thereafter, as the magnetic structure is further traversed away from the casing joint, no potential or only small and negligible potentials will be induced in coil 38 by the slight unbalances produced in the magnetic fields by ordinary nonhomogenities or other irregularities in the well casing.

The potential of reversing polarity generated in coil 38 as the magnetic structure is traversed past a casing joint as applied between the ground, indicated at the lower end of coil 38 in the center pole piece 37, and terminal 31 at the lower end of case 21.

Referring now to Figure 2, the apparatus housed in case 21 is diagrammatically depicted within the dashed line rectangle 25, with lead 31 extending from the lower boundary thereof and contact 27 protruding from the upper boundary thereof. Comprised in case 21 is electrical apparatus including a pair of electron tubes 40 and 42, each having an electron discharge path including a cathode, a pair of electron stream or flow control elements or grids (respectively designated 40a, 40b, 42a and 42b), and an anode, (denoted respectively by numerals 40c and 42c). The cathodes of the two electron tubes are supplied with suitable heating current by means of a filament battery B1, in the manner and by means indicated. Anodes 40c and 42c are interconnected by a center-tapped electrical impedance means, preferably, but not necessarily, of inductive nature, and in this case comprising the primary T1 of a transformer T. The primary is provided with a midpoint tap through which electron attracting potential is applied to anodes 40c and 42c by means of a battery B2 connected between the midpoint tap and ground, as indicated. Electron discharge path control elements 40b and 42b are supplied with alternating potential of a selected frequency through individual adjusting circuits 44 and 46 by a suitable alternating potential supply means which in the preferred embodiment assumes the character of an electronic oscillatory circuit and its appurtenances. This circuit includes the right-hand or triode section of electron tube 42 and battery B2 as indicated, and a grid circuit inductively coupled to tank 47 and connected between ground and the control grid of the triode section of tube 42 as indicated. The circuitry thus-far described is adjusted by means of the adjustable elements indicated in the circuit diagram so that the alternating potential produced across the oscillatory circuit is applied in like phase to the control grids 40b and 42b of the respective electron tubes, and such that the inputs to transformer T are balanced, with the result that substantially no potential, or only a negligible potential, is under this condition generated in the secondary T2 of transformer T.

Coil 38 of the aforementioned magnetic structure contained in container 13 and indicated at the lower portion of Figure 2 is connected by leads 31 directly to the first control grid 42a of electron tube 42 as indicated, whereby the reversing potential generated in coil 38 as the magnetic structure traverses a casing joint is applied in a certain phase relationship to control grid 42a. The reversing potential generated in coil 38 as the magnetic structure is traversed past a joint or other magnetic anomaly in the casing is also applied to a control electrode of electron tube 40, but in phase relationship opposite to that of the same potential applied to control grid 42a of electron grid 42. To this end the reversing potential generated in coil 38 is inverted in phase by means including a triode section of electron tube 40, the control grid of which triode section is directly connected to leads 31 as indicated. The anode of the triode section of electron tube 40 is connected through a suitable load resistor 50 to battery B2 as indicated. The output potential of the triode section of tube 40 is applied by way of capacitor C1 to the control grid 40a of electron tube 40 as indicated. Thus, the potential of negligible magnitude generated in coil 38 as the magnetic structure is traversed along the interior of a single length of casing is of practically no effect in producing an output in the secondary T2 of transformer T. However, as the magnetic means is traversed past a joint between two lengths of the casing, the reversing potential generated in coil 38 and applied in opposite phase relationship to control grids 40a and 42a causes a considerable unbalance in the electron flow outputs through anodes 40b and 42b, and thus causes the generation in secondary T2 of the transformer of a potential of considerable magnitude comprised of a potential of the same frequency as that of the oscillator heretofore mentioned, modulated by the potential induced in coil 38. The alternating components of the potential generated in secondary T2 are utilized as a signal indicating the passing of the magnetic means past a casing joint, and the signal is used in other means to indicate the location of the joint, or to indicate location of the magnetic structure at the joint. The signal is transmitted via a capacitor C2 to contact 27 from which it is impressed upon terminal 20 and a selected one of the conductors of cable 14. The circuit constants and other characteristics of the apparatus selected to comprise the elements diagrammatically depicted in Figure 2 are such that the signal in the form of an alternating potential passed through capacitor C2 and impressed upon a cable conductor is such as to be readily filtered from and not interfere with other currents and/or voltages impressed on or carried by the several conductors of cable 14. The signal thus generated in response to traversal of the magnetic means in container 13 past a discontinuity or joint in the well casing is transmitted by a conductor of cable 14 to apparatus located exteriorly of the borehole and at the surface of the earth. There the signal may be suitably filtered from any other potentials impressed on or existing on the conductors of the cable, if necessary, and is applied to a suitable recorder means indicated generally at 55 in Figure 1. The recorder means comprises signal transducer means including a recorder having a strip chart 56 upon which is drawn a graph of the received and translated signal by means of a recorder pen 57 in a manner well understood in the art. The strip record medium or paper of the recorder means is drawn past recorder pen 57 synchronously with and at a rate directly proportional to the rate of traversal of container 13 through the casing. To the latter end the strip of the recorder is traversed past pen 57 by means in the recorder including a synchrometer means electrically connected to and governed by a synchrogenerator 59 suitably driven, as indicated, from cable 14. As indicated, conductors 60 interconnect the synchrogenerator 59 with the synchromotor means of recorder 55. Power is supplied to the recorder means 55 from a suitable power supply source, indicated generally in Figure 1 by numeral 61. The recorder pen is zeroed at its center position with zero input signal potential. The incoming signal potential is demodulated in conventional manner by demodulator means in the recorder, and applied to the deflecting coil of the recorder, whereby the pen draws upon the moving strip 56 a graph having slight or no undulations along the base line until the magnetic apparatus in the container 13 passes a joint in the casing, at which time the recorder pen will be caused to execute a first departure from the base line and a return, then a second departure from and return to the center line to make a pair of positive pips or departure marks on the graph as indicated in Figure 1. It is evident that the pip first produced is that due to the signal initiated by passage of the first magnetic field or flux path past the casing joint, and second or opposite pip is that produced in similar manner as the second magnetic field passes the casing joint.

By means of the structure just described, as the container 13 is traversed from the top to the bottom of a cased borehole or in the opposite direction from the bottom to the top of the well casing, a record is made of the relative location of each of the casing joints or junctures. Also, when the casing collar locator or detector is used in conjunction with well logging or casing perforating apparatus, for example, the auxiliary apparatus may replace bullhead 18 on the lower end of container 13, and positioned relatively precisely with respect to any particular casing joint in the casing string by traversing the apparatus through the casing while permitting recorder 55 to make a record of the passage of each casing joint as the apparatus is lowered in the borehole. Since by previous surveys, such as, for example, gamma ray surveys, the location of a particular zone at which perforation of the casing or other operation is desired to be effected is generally precisely known with respect to the location of a particular joint of the casing, the perforating apparatus may be precisely located by traversal of the apparatus through the casing until the desired casing joint has been reached by the magnetic structure, after which the apparatus is raised or lowered, if necessary, the few inches or feet required to exactly locate the operating apparatus at the desired point.

From the preceding description it will be seen that the invention provides a casing joint detector or locator which provides a signal when moved past a joint or other magnetic anomaly in steel casing in an earth borehole, and which is simple in construction and may be contained in a container of small diametral dimensions; and which detector may be used without interruption or impairment of other operations performed by means utilizing the several conductors of the conductor cable 14. It will be understood that other conductors of cable 14 or leads extending therefrom may, in the event other apparatus is used instead of bullhead 18, be carried through the interior of container 13 through suitable recesses or passages formed in the interior of the container, without detriment to the action or functioning of the magnetic structure and apparatus contained in case 21. Since the signal utilized to carry indications or detections of casing joints from within the casing in the borehole to the surface is comprised of a modulated wave of specific frequency produced by the oscillatory circuit means, it will be seen that stray direct current potentials and/or currents, and the other currents and/or voltages utilized in the conductors of cable 14, will not in any way interfere with proper operation of the casing joint detector and its recorder. Thus the casing joint detector is freed from the objection of malfunctioning caused by the impressing or introduction of extraneous currents and/or voltages not of the frequency of the modulated wave on the conductors of cable 14, and may be used and operated without detriment to other apparatus suspended from the cable. Preferably, the electron tubes 40 and 42 utilized in the apparatus depicted in Figure 2 are of miniature or subminiature type, and the apparatus case 21 and other structures are suitably cushioned, as by means of foamed material packing, as indicated, for example, in the upper container section 16. Thus the apparatus may operate satisfactorily in the environment of extreme shock and/or vibration incident to casing perforating or other operations conducted in the well or borehole.

This application in certain aspects is related to my copending application Serial No. 500,863 filed on even date herewith.

While the hereinabove stated objects and advantages of the inventive concept are attained by the preferred embodiment of apparatus hereinbefore described, it will be evident to those skilled in the art that various modifications of the apparatus and mode will be suggested and taught by the disclosure. Accordingly, it is not desired to be limited to the specific details of structure herein disclosed and depicted in the drawings, but what is claimed is:

1. A casing joint detector for providing a signal when moved past a joint in a steel casing in an earth borehole, comprising in combination: means including a container adapted to be traversed through the casing; magnetomotive force-producing means in said container for producing magnetic flux in a path such as to include a longitudinally extending section of the casing when the container is in the casing; potential generating means in inductive relation with the magnetic flux in said path, for generating an electric potential in response to changes in magnetic flux in said path; means providing an alternating potential in said container; means in said container including a pair of electron tubes each having an electron discharge path each comprising a cathode, at least two control electrodes and an anode; impedance means interconnecting the anodes of said tubes and having an intermediate tap from which anode current is drawn; means for applying said alternating potential in like phase to one control electrode of each of said tubes; means including connections to apply at least part of the generated potential of said potential generating means in opposite phase relationship to the other of said control electrodes of said tubes; and a signal producing means responsive to unbalanced flow of current in said impedance means on either side of said tap thereof for producing a signal indicative of variations in reluctance of said magnetic flux path incident to traversal of said first-named means past a joint in said casing.

2. A well casing joint detecting apparatus for providing a signal as the apparatus is traversed past a casing joint of a steel casing in a well, comprising in combination: first means including magnetic means for traversal through such casing and arranged to produce magnetic flux in a path including a longitudinally extending portion of said casing when positioned therein; means in said first means providing first and second electron discharge paths, each including a cathode, first and second electron flow control elements, and an anode; means providing and applying to said second electron flow control elements alternating potentials of like phase; potential generating means in inductive relationship with said magnetic flux for generating a varying potential when said flux varies incident to traversal of said magnetic means past a joint in said casing; means for applying said varying potential in opposite polarity to respective elements of said first electron flow control elements; means including an impedance means interconnecting said anodes and having an intermediate tap and applying an electron attracting potential between said cathodes and said anodes through said tap; and signal generating means coupled to said impedance means to derive a signal potential therefrom incident to unbalanced electron flow in said electron discharge paths incident to application of said varying potential in opposite polarity to said first electron flow control elements.

3. A casing joint detector for providing a signal when moved past a joint in a steel casing, comprising in combination: means including a container adapted to be traversed through the casing; magnetomotive force producing means in said container and arranged to produce magnetic flux in a path including a longitudinally extending portion of such casing when positioned therein; electron tube means in said container providing first and second electron discharge paths, each including a cathode, first and second control grids, and an anode; an inductive impedance interconnecting said anodes and having a midpoint tap; means for applying an electron-attracting potential to said anodes through the midpoint tap of said inductive impedance means; an alternating potential source and connections therefrom to apply an alternating potential therefrom to said second control grids in like phase; inductive potential generating means in inductive relationship with said magnetic flux, for generating a varying potential when said flux varies incident to traversal of said magnetic means past a joint in said casing; means for applying said varying potential in opposite polarity sense to respective of said first control grids; and a signal generating means inductively coupled to said inductive impedance means to derive a signal therefrom incident to unbalance of the electron flow from said anodes incident to application of said varying potential in opposite polarity sense to said first control grids.

4. A well casing joint detecting apparatus adapted for traversal through a steel casing in a well for providing a signal as the apparatus passes a casing joint during such traversal comprising in combination: means including a container adapted to be traversed through the casing; means including magnetomotive force-producing means arranged to produce a pair of normally balanced magnetic flux paths including longitudinaly extending portions of such casing when positioned therein, said paths becoming unbalanced incident to passage of the magnetomotive force producing means past a joint in such casing; potential generating means in inductive relationship with said magnetic flux paths when the latter are unbalanced, for generating a varying potential incident to unbalance of said flux paths incident to traversal of said magnetomotive force-producing means past a joint in said casing; means in said container including electron tube means having first and second electron discharge paths each including a cathode, at least two electron flow control elements and an anode; center-tapped inductive impedance means interconnecting said anodes; means for applying an electron-attracting potential between said cathodes and said anodes through the center tap of said inductive impedance means; means for applying said varying potential in opposite polarity to respective elements of said first electron flow control elements; means including an oscillatory electric circuit for producing an alternating potential and for applying said alternating potential in like phase to electron flow control elements in each of said paths; and signal generating means inductively coupled to said inductive impedance means to derive therefrom a signal incident to unbalancing of the electron flow in said electron discharge paths incident to application of said varying potential to said respective electron flow control elements.

5. Means for locating a joint in a steel casing in an earth well, comprising, in combination: means including casing joint detector means arranged for support and traversal through a steel casing and including magnetic means providing a magnetic field of a first general configuration when adjacent a joint in said casing and of a second general configuration when located elsewhere in said casing; inductive means in said detector means, responsive to a change of said magnetic field from either of said configurations to the other thereof to produce a varying potential in response to such change; operative electric wave signal generating means, and means for modulating the wave signal output of such signal generating means in accordance with said varying potential; means to transmit and receive the modulated wave signal; and means to demodulate the received signal and form a record of the demodulated signal indicative of the location of said first-named means with respect to a joint in said casing.

6. Means for locating a joint in a steel casing in an earth well, comprising, in combination: first means arranged for support and traversal through a steel casing and including an oscillatory electric wave signal generating means having an output; permanent magnetic means included in said first-named means for forming magnetic flux in said casing; inductive means in said first-named means associated with said magnetic means and arranged to produce a varying voltage as said magnetic means is traversed past a joint in said casing; further means included in said first-named means for modulating the oscillatory wave output of said oscillatory wave generating means in accordance with said varying voltage; means to transmit the modulated oscillatory wave to a location outside said casing; means to receive said transmitted modulated wave; and means to form a graphical record of the modulated wave synchronously with traversal of said first-named means through said casing, to form a graphical indication of the traversal of said first-named means past a joint in said casing.

7. Means for providing a graphical indication of the location of a joint in a steel casing in an earth well, comprising, in combination: first means arranged for support and traversal through a steel casing and including first and second magnets positioned to produce magnetic flux in said casing adjacent said first means, and in induction means positioned between said first and said second magnets whereby a sharply reversing electric potential is induced in said inductive means when said first means is traversed past a joint in said casing and substantially zero potential when traversed elsewhere in said casing; normally balanced electric wave generating means in said first-named means; means included in said first-named means acting to apply said sharply reversing electric potential to said electric wave producing means to thereby unbalance the latter to produce a modulated electric wave signal therefrom; means to transmit said electric wave signal to a location outside said casing; and means driven in synchronism with traversal of such first-named means through said casing to form a graphical record of such signal indicating the relative location of the traversed joint in said casing.

8. Means for graphically indicating the relative locations of joints in a jointed steel casing in the earth well, comprising, in combination: first means arranged for support and traversal through such steel casing and including permanent magnet means for forming magnetic flux in said casing and induction means sensitive to changes in said magnetic flux to sense magnetic discontinuities in said casing by producing a sharply reversing electric potential when traversed past such discontinuity; electric signal wave generating means included in said first-named means; means acting to modulate the electric signaling wave of said signal wave generating means in accordance with said sharply reversing electric potential when said first-named means is traversed past a magnetic discontinuity in said casing; and means utilizing said modulated signal wave and operated synchronously with traversal of said first-named means through said casing to form a graphical record derived from said modulated signal wave and indicative of the relative locations of the traversed discontinuities in said casing.

9. Means for graphically indicating the relative locations of magnetic discontinuities in a steel casing in an earth well, comprising in combination: means including a first and second permanent magnet arranged in magnetic repelling relationship, and a coil mounted therebetween, said first means being arranged for support and traversal through a steel casing; means included in said first-named means providing a continuous wave electric signal during traversal of said first-named means through said casing, and said first-named means further including means to modulate the continuous wave signal by a signal induced in said coil to form a modulated signal indicative of discontinuities in said casing; means outside said casing for manifesting said modulated signal; and means connecting said first-named means with said signal manifesting means outside said casing and transmitting said signal therebetween.

References Cited in the file of this patent
UNITED STATES PATENTS

| | | |
|---|---|---|
| 1,996,906 | De Lanty | Apr. 9, 1935 |
| 2,558,427 | Fagan | June 26, 1951 |
| 2,573,133 | Greer | Oct. 30, 1951 |
| 2,573,137 | Greer | Oct. 30, 1951 |
| 2,615,956 | Broding | Oct. 28, 1952 |